United States Patent [19]
Speck

[11] 3,958,930

[45] May 25, 1976

[54] DEEP-DYED NYLON FIBER AND DYED STYLING YARN

[75] Inventor: Stanley Brooke Speck, Wilmington, Del.

[73] Assignee: E. I. Du Pont de Nemours & Company, Wilmington, Del.

[22] Filed: Oct. 31, 1973

[21] Appl. No.: 411,426

Related U.S. Application Data

[62] Division of Ser. No. 301,811, Oct. 30, 1972, Pat. No. 3,802,836.

[52] U.S. Cl. ............................................. 8/26; 8/27; 8/28; 8/41 B; 260/162; 260/163; 260/186; 260/191; 260/198; 260/199; 260/371; 260/374; 260/378; 260/380

[51] Int. Cl.$^2$ ........................................... D06P 3/24

[58] Field of Search ................ 8/41 B, 28, 26, 27, 8/39; 260/162, 163, 186, 191, 198, 371, 372, 373, 374

[56] References Cited

UNITED STATES PATENTS

| | | | |
|---|---|---|---|
| 901,675 | 10/1908 | Röniger | 260/163 |
| 1,408,405 | 2/1922 | Schöner et al. | 260/198 |
| 2,065,680 | 12/1936 | Fleischhauer | 260/198 |
| 2,152,408 | 3/1939 | Graenacher et al. | 260/186 |
| 2,746,955 | 5/1956 | Armento | 260/175 |
| 2,773,055 | 12/1956 | Hindermann et al. | 260/163 |
| 2,776,962 | 1/1957 | Frisch et al. | 260/198 |
| 2,842,537 | 7/1958 | Strobel et al. | 260/163 |
| 3,023,071 | 2/1962 | Jirou | 260/191 X |
| 3,267,089 | 8/1966 | Feeman | 260/191 |
| 3,284,436 | 11/1966 | Frisch | 260/198 |
| 3,420,856 | 1/1969 | Bengueral | 260/374 |
| 3,436,410 | 4/1969 | Weinand et al. | 260/373 |
| 3,485,569 | 12/1969 | Newby et al. | 8/21 |
| 3,485,814 | 12/1969 | Speck | 260/186 |
| 3,491,126 | 1/1970 | Schwander et al. | 260/374 |
| 3,594,112 | 7/1971 | Guenthard | 260/374 UX |
| 3,594,363 | 7/1971 | Stingl | 260/186 |
| 3,676,050 | 7/1972 | James | 260/191 X |

FOREIGN PATENTS OR APPLICATIONS

| | | | |
|---|---|---|---|
| 343,449 | 2/1931 | United Kingdom | 260/373 |
| 225,319 | 8/1909 | Germany | 260/162 |
| 288,878 | 5/1914 | Germany | 260/374 |
| 41-1421 | 2/1966 | Japan | 260/186 |
| 7,114,007 | 4/1972 | Netherlands | 260/198 |
| 7,114,008 | 4/1972 | Netherlands | 260/198 |
| 7,114,009 | 4/1972 | Netherlands | 260/373 |

OTHER PUBLICATIONS

Colour Index, 2nd Edition, Vol. 3, p. 3497, Nos. 61570, 61580 and 61585, (1956).

Colour Index, 2nd Edition, Vol. 3, p. 3507, No. 62560, (1956).

*Primary Examiner*—Floyd D. Higel

[57] ABSTRACT

Deep-dyed nylon fiber and dyed styling yarn which have been dyed from an aqueous dye bath having a pH of 4–7 and containing novel orange and/or compatible yellow, orange, red, blue, blue-green or green disulfonated or monosulfonated/monocarboxylated monoazo, disazo or anthraquinone acid dyes which have good application and fastness properties on deep-dyeing nylon fiber and good non-staining properties on acid-modified nylon fiber.

1 Claim, No Drawings

DEEP-DYED NYLON FIBER AND DYED STYLING YARN

CROSS-REFERENCE TO RELATED APPLICATION

This is a division of application Ser. No. 301,811 filed Oct. 30, 1972 and issued Apr. 9, 1974 as U.S. Pat. No. 3,802,836.

BACKGROUND OF THE INVENTION

1. Field of the Invention

This invention relates to aqueous dye baths containing mixtures of compatible acid dyes, some of which are novel, which are useful for dyeing deep-dyeing nylon fibers.

2. Description of the Prior Art

Nylon styling yarns have increased in commercial importance in recent years because of their physical and chemical durability and their multicolor dyeability. Such properties are especially desirable in carpet fibers. Nylon styling yarns generally consist of fibers of an acid-modified (anionic) nylon containing sulfonic acid groups which make the fibers receptive to basic dyes and two or more unmodified nylons which differ in their amine end group content and hence their receptivity to acid dyes. Such yarns are known to be dyeable both by exhaust and continuous methods. In the carpet industry such yarns in the form of bulked continuous filament (BCF) yarns may be dyed with combinations of basic, acid and disperse dyes. Basic (cationic) dyes which have good application and fastness properties on acid-modified nylon and which reserve, that is, produce little or no stain on, unmodified nylons under the neutral to weakly acidic conditions used to dye nylon styling yarns are readily available commercially. Also readily available are monosulfonated acid dyes which reserve acid-modified nylon while producing light to heavy shades of good fastness properties on unmodified nylons, the shade depending on the amine end group content of the unmodified nylon. Light-dyeing nylons are generally recognized in the art as having an amine end group content of 25 gram equivalents or less per million grams of the polymer; deep-dyeing nylons generally contain 70 or more gram equivalents of free amine end groups per million grams of the polymer; and medium-dyeing nylons contain an intermediate number of amine end groups, generally about 40–50 gram equivalents per million grams of the polymer. Disperse dyes can be used to dye acid-modified and all types of unmodified nylon fibers to the same degree. It can be seen, therefore, that a combination of basic, acid and disperse dyes can be employed to achieve a broad range of color effects on nylon styling yarns. This range can be broadened by using disulfonated or monosulfonated/monocarboxylated dyes instead of the aforesaid monosulfonated dyes. Such dyes have considerably more affinity for deep-dyeing nylons and produce a much greater shade contrast between these fibers and light-and medium-dyeing nylons than is possible with monosulfonated dyes. In practice, the selection of dyes containing two functional acidic groups for use on nylon styling yarns is extremely difficult. Although such dyes may have adequate buildup and lightfastness on deep-dyeing nylon in self-shades and show good reserve of light-dyeing and acid-modified nylons, they may exhibit a blocking action on each other when applied from the same dye bath. In other words, one diacidic dye may preferentially dye deep-dyeing nylon and prevent another such dye from exhausting completely onto the substrate, in which case unlevel dyeings may be produced and the anticipated mixed shade may not be obtained. In the continuous dyeing of tufted nylon styling yarn carpeting, the use of diacidic dyes which exhibit the incompatibility described above may result in tippy dyeings (tippiness) wherein the top of the tuft is different in shade from the bottom.

SUMMARY OF THE INVENTION

It is an object of this invention to provide aqueous dye baths containing compatible yellow, orange, red, blue, blue-green or green acid dyes which are useful for dyeing deep-dyeing nylon fibers while exhibiting little or no blocking action upon each other. It is a further object to provide dye baths containing such dyes which exhibit good application and fastness properties on deep-dyeing nylon fibers and excellent reserve of acid-modified nylon fibers. It is a still further object to provide dyes which exhibit excellent shade contrast on light-, medium- and deep-dyeing nylons. In summary, the invention relates to aqueous dye baths which are useful in dyeing deep-dyeing nylon fibers, which dye baths have a pH of 4–7 and contain dyes, some of which are novel, selected from 2–3 of the following groups, wherein M in each group is a cation selected from H, Li, Na, K, $NH_4$, di(hydroxy-$C_{2-3}$alkyl)ammonium and tri(hydroxy-$C_{2-3}$alkyl)ammonium:

1. A yellow dye of the structure

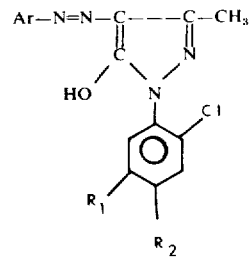

wherein
a. Ar is

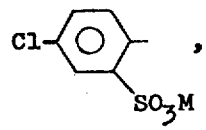

$R_1$ is Cl and $R_2$ is $SO_3M$,
b. Ar is

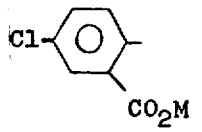

$R_1$ is Cl and $R_2$ is $SO_3M$, or
c. Ar is

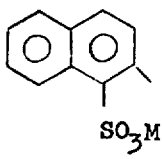

$R_1$ is $SO_3M$ and $R_2$ is H;

2. An orange dye of the structure

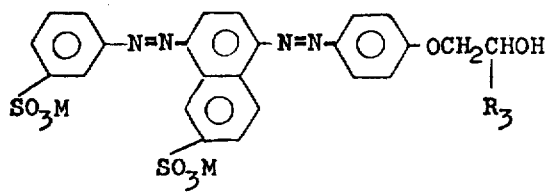

wherein $R_3$ is H, $CH_3$ or $C_2H_5$;

3. A novel orange dye of the structure

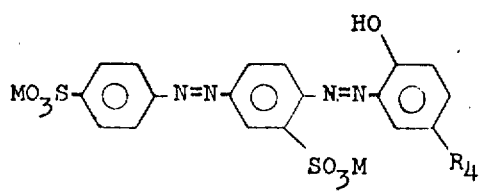

wherein $R_4$ is $C_{1-8}$ alkyl

4. A red dye of the structure

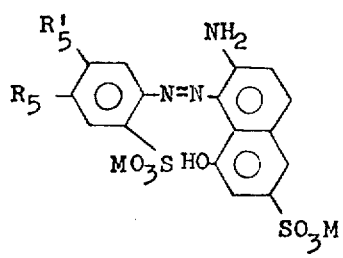

wherein one of $R_5$ and $R'_5$ is H and the other is $C_6H_5CONH$;

5. A blue dye of the structure

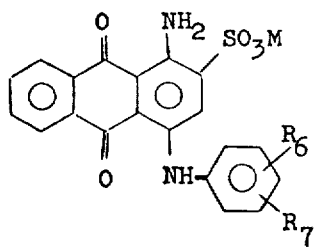

wherein $R_6$ is $SO_3M$ and $R_7$ is H, $CH_3$, $OCH_3$ or Cl, or $R_6$ is p-$NHCOCO_2H$ and $R_7$ is H; and 6. A blue-green to green dye of the structure

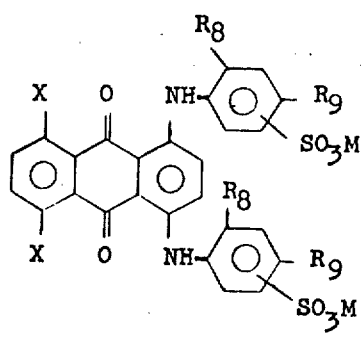

wherein X is H or OH, $R_8$ is H and $R_9$ is $C_2H_5$, $C_3H_7$, $OCH_3$ or $OC_2H_5$, or $R_8$ is $CH_3$ and $R_9$ is $CH_3$ or $OCH_3$.

Generally no more than one dye is selected from each of the 2–3 groups since there is little shade variation within a group.

DETAILED DESCRIPTION OF THE INVENTION

The invention, as already stated, relates to aqueous dye baths having a pH of 4–7, which dye baths contain a mixture of acid dyes, some of which are novel, selected from 2–3 of the aforesaid six dye groups. Following is a discussion of each of the six groups.

The yellow monoazo dyes are, for the most part, known in the art and are preparable by conventional diazotization and coupling techniques employing as the diazo compound 5-chloroorthanilic acid, 5-chloroanthranilic acid or 2-naphthylamine-1-sulfonic acid and as the coupling compound 1-(2,5-dichloro-4-sulfophenyl)-3-methylpyrazol-5-one or 1-(2-chloro-5-sulfophenyl)-3-methylpyrazol-5-one.

The first group of orange disazo dyes can be prepared by adding ethylene-, propylene- or butylene oxide to the disazo dye obtained, by conventional diazotization and coupling techniques, from metanilic acid, 1-naphthylamine-6-sulfonic acid and phenol. The addition reaction is carried out under alkaline conditions at an elevated temperature, preferably 70°–100°C. Because of the low boiling points of ethylene oxide and propylene oxide, either is best reacted with the disazo dye in an autoclave. The preferred basic catalyst is lithium or sodium hydroxide in an amount up to about 20 mole percent of the disazo compound. Significantly more base than this causes an undue amount of deactivation of the epoxide by ring opening. A one- to three-fold molar excess of the epoxide over the disazo dye is desirable to ensure a high yield of the product. Precipitation of the dye can be achieved, if necessary, by salting the aqueous or aqueous organic reaction mixture. The dye is then isolated by filtration. Experiment 1 provided hereafter illustrates the preparation of one such orange dye.

The second group of orange disazo dyes includes novel dyes which can be prepared by coupling diazotized 4-aminoazobenzene-3,4'-disulfonic acid to a p-$C_{1-8}$ alkylphenol under alkaline conditions employing known procedures. Such dyes wherein M is Na and $R_4$ is $C_{1-8}$ alkyl (in the formula previously given) exhibit the following spectral data:

| $R_4$ | Absorptivity (liters/gram/cm.) | Wavelength of Maximum Absorbance (mµ) |
|---|---|---|
| $CH_3$ | 50.0 | 365 |
| t-butyl | 42.2 | 365 |
| t-amyl | 32.8 | 367 |
| t-octyl | 9.1 | 368 |

Such dyes have excellent lightfastness on deep-dyeing nylon, showing no break after 80 hours in a Xenon Arc Fade-Ometer.

The red monoazo dyes can be prepared by conventional diazotization and coupling techniques employing 4- (or 5-)benzamidoaniline-2-sulfonic acid and 7-amino-1-naphthol-3-sulfonic acid (Gamma acid).

The blue anthraquinone dyes can be prepared by conventional procedures. Two such dyes can be prepared by condensing 1-amino-4-bromoanthraquinone-2-sulfonic acid (Bromamine acid) with metanilic acid or oxalic acid mono-4'-aminoanilide. Other such blue dyes can be prepared by condensing Bromamine acid in known manner with aniline, o-, m- or p-toluidine, o-, m- or p-anisidine, or o-, m- or p-chloroaniline, followed by sulfonation of the phenyl ring. Experiment 3 provided hereafter illustrates the preparation of one such blue dye.

The blue-green to green anthraquinone dyes can be prepared by well known bis condensation procedures employing 1,4-dihydroxyanthraquinone, 1,4-dichloro(or dibromo)anthraquinone or 1,4,5,8-tetrahydroxyanthraquinone and a suitable aniline derivative, the bis condensation product then being disulfonated in a conventional manner. Suitable aniline derivatives include 2,4-xylidine, 4-ethylaniline, 4-propylaniline, 2-methyl-4-anisidine, 4-anisidine and 4-phenetidine.

For economic reasons, the aforesaid acid dyes are usually isolated as the sodium salts. However, it is sometimes advantageous to prepare the acid dye as the lithium, potassium, ammonium, di(hydroxy-$C_{2-3}$alkyl)ammonium or tri(hydroxy-$C_{2-3}$alkyl)ammonium salt, or a mixture of such salts, in order to improve its water solubility. The salt can be formed during the preparation of the dye. Alternatively, the sodium salt of the dye can be dissolved in water and acidified with a mineral acid to give the free acid form of the dye which can then be isolated by filtration or by extraction into a suitable solvent, such as n-butanol, followed by evaporation to dryness. The free acid can then be converted to the desired salt by titration in water against a suitable base, such as lithium, potassium or ammonium hydroxide, or an alkanolamine such as diethanolamine, diisopropanolamine or triethanolamine, or a mixture of such amines.

The aforesaid acid dyes employed in the aqueous dye baths of this invention include representatives of the three primary colors red, yellow and blue and can, therefore, be mixed to produce a complete range of colors. Since acid dyes form ionic bonds with basic groups on the substrate, the aforesaid dyes have utility on any polycarboxamide fiber containing a sufficiently high concentration of amine end groups, including the commercially available deep-dyeing and ultra-deep-dyeing nylons which contain 70–120 gram equivalents of amine end groups per million grams of the polymer. The most common of these deep-dyeing nylons is poly(hexamethylene adipamide).

The dye baths of this invention can be applied to nylon styling yarns by batch or continuous methods. The most important end use for such yarns is carpeting although they are employed in other end uses, such as upholstery or accent rugs (throw rugs). The batch dyeing of carpets is normally carried out in a beck; upholstery is commonly dyed in jigs and accent or throw rugs, in paddle machines. The dyeing procedure is essentially the same in each case. The continuous dyeing of nylon carpeting is carried out in equipment such as the commerically available Kusters machine described in Example 1. Whether applied by batch or continuous procedures, the dyes employed in the dye baths of this invention produce uniform shades on deep-dyeing nylon fibers and uniform on-tone but much lighter shades on light- and medium-dyeing nylons, if present. Little or no tippiness is observed on tufted nylon carpeting, the tufts being dyed a uniform shade from top to bottom. Acid-modified nylon is completely reserved by the dyes employed herein.

Monosulfonated, disperse and basic dyes also can be present in the dye baths of this invention. Co-precipitation of tne acid and basic dyes can be prevented by means of various agents known in the art, for example, an amphoteric agent such as the sulfobetaine having the formula

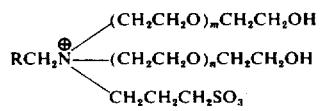

wherein R is alkyl of 7–17 carbon atoms and m, n and the sum of m and n are 0–3. The dyeing of nylon styling yarns is generally carried out at a pH of 4–7, depending on the particular procedure and the types of dyes present in the dye bath. Hence, the dye baths of this invention are most desirably maintained at a pH of 4–7.

Representative syntheses of the dyes which are used in the above-described dye baths are included in the following experiments wherein all parts are by weight unless otherwise noted.

Experiment 1 - Preparation of Orange Disazo Dye

Metanilic acid was diazotized by a conventional procedure and coupled under acidic conditions to 1-naphthylamine-6-sulfonic acid. A slurry of 60.2 parts of the resulting monoazo amine in 500 parts of water and 37.5 parts of 10N-hydrochloric acid was cooled to 10°C. and 18.3 parts of 5N-sodium nitrite were added portionwise. After the mixture was stirred for 30 minutes, excess nitrite was destroyed with sulfamic acid and the diazo solution was added over a 1.5-hour period to a solution of 5.9 parts of phenol in 250 parts of water containing 40 parts of sodium carbonate and 53 parts of 30 percent sodium hydroxide solution which had been precooled to 10°C. The reaction mixture was stirred for 2 hours, the temperature being allowed to rise to 25°C. The pH was adjusted to 7.3 with hydrochloric acid and 165 parts of sodium chloride were added with agitation. The resulting precipitate was isolated by filtration and dried, yielding 37.1 parts of the crude disazo dye. The solids were slurried in 192 parts of water and 90 parts of ethylene glycol monoethyl ether. The pH was adjusted to 9.5 with sodium hydroxide and the mixture was heated in an autoclave with 5.3 parts of ethylene oxide at 95°C. for 14 hours.

The mixture was cooled and the product was collected on a filter, washed with 10 percent aqueous sodium chloride solution and dried. The yield of orange dye was 27.2 parts; the dye exhibited an absorptivity (amax.) of 48.2 liters/gram/cm. (1./g./cm.) at a wavelength ( λmax. ) of 435 mμ. It had the structure given above wherein $R_3$ is H and M is Na.

Experiment 2 - Preparation of Novel Orange Disazo Dyes a. 4-Aminoazobenzene-4'-sodium sulfonate (9 parts) was added in 2 hours with stirring to a mixture of 20.75 parts of 100 percent sulfuric acid and 0.9 part of 65 percent oleum (100 percent sulfuric acid containing 65 weight percent $SO_3$). After the reaction mixture had been stirred for an additional 0.5 hour, it was cooled to 17°C. and 12.7 parts of 65 percent oleum were added, the temperature being maintained at 17 ± 2°C. The mixture was stirred at ambient temperature for 15 hours and then drowned in 51 parts of water, the temperature being kept below 40°C. The mass was then cooled to 5°C. and stirred for 0.5 hour. The solids were isolated by filtration. The wet cake was slurried in 160 parts of water and dissolved by heating slowly to 55°C. with agitation. After 15.8 parts of concentrated hydrochloric acid had been added, the mixture was allowed to cool to room temperature with occasional agitation. It was then cooled externally to 10°C. and stirred at this temperature for 24 hours. The solids were then filtered off, washed with 16 parts of 3 percent hydrochloric acid and dried. A yield of 5.8 parts of yellow product was obtained.

b. A slurry of 2.5 parts of the solids from (a) in 12 parts of water and 2.84 parts of concentrated hydrochloric acid was cooled to 5°C. and treated portionwise with 1.88 parts of 5N-sodium nitrite. After the mixture had been stirred for 0.5 hour at about 5°C., excess nitrite was destroyed with sulfamic acid and the cold diazo preparation was added dropwise to a rapidly stirred solution of 1.12 parts of p-t-butylphenol, 24.5 parts of water, 11 parts of ethanol, 28 parts of sodium hydroxide and 2.1 parts of anhydrous sodium carbonate at 25°-30°C. The pH of the reaction mixture was maintained at 9 by periodically adding aqueous caustic soda. When addition of the diazo compound was complete, the mixture was stirred for 0.5 hour at 25°-30°C. and the solids were isolated by filtration, washed with 10% aqueous sodium chloride and dried. A yield of 2.25 parts of dye was obtained; the dye exhibited an absorptivity of 42.2 liters/gram/cm. at a wavelength ($\lambda_{max}$) of 365 mμ.

c. When (b) was repeated three times except that p-t-butylphenol was replaced with an equimolar amount of p-cresol, p-t-amylphenol and p-t-octylphenol, respectively, orange dyes were obtained having the spectral characteristics previously given.

Experiment 3 - Preparation of Blue Anthraquinone Dye

The pH of a mixture of 24.2 parts of Bromamine acid and 20.6 parts of sodium metanilate in 100 parts of water was adjusted to 7 with hydrochloric acid. Next were added 7 parts of sodium carbonate, 10.2 parts of sodium bicarbonate, 1.35 parts of cuprous chloride and 140 parts of water. The mixture was stirred at 70°-80°C. for 12 hours. The reaction mixture was clarified by filtration and the product was salted out of solution with sodium chloride. The dye was isolated by filtration, washed with 25 percent aqueous sodium chloride solution and dried. A yield of 32.8 parts of chromatographically pure blue dye was obtained. It had the structure given above wherein $R_6$ is m-sulfo, $R_7$ is H and M is Na.

In order to illustrate the utility of the dye baths of this invention, the examples given below describe their application, in the absence of other dyes, to nylon test carpeting which consists mainly of various types of nylon tufted in discreet bands onto a jute backing. The identification of the dyes employed in the dye baths of the examples corresponds to the descriptions of the six groups of structures recited above. In all cases, M is Na. For those descriptions above which include a plurality of dyes, the following additional identification is provided. Any dye containing a sulfo group was used as the Na salt.

| | |
|---|---|
| Orange Dye 2 | Dye 2 where $R_3$ is H |
| Orange Dye 3(a) | Dye 3 where $R_4$ is $CH_3$ |
| Orange Dye 3(b) | Dye 3 where $R_4$ is t-butyl |
| Orange Dye 3(c) | Dye 3 where $R_4$ is t-amyl |
| Orange Dye 3(d) | Dye 3 where $R_4$ is t-octyl |
| Red Dye 4(a) | Dye 4 where $R_5$ is $C_6H_5CONH$ and $R_5'$ is H |
| Red Dye 4(b) | Dye 4 where $R_5$ is H and $R_5'$ is $C_6H_5CONH$ |
| Blue Dye 5(a) | Dye 5 where $R_6$ is m-sulfo and $R_7$ is H |
| Blue Dye 5(b) | Dye 5 where $R_6$ is p-NHCOCO$_2$H and $R_7$ is H |
| Blue Dye 5(c) | Dye 5 where $R_6$ is o-sulfo and $R_7$ is p-CH$_3$ |
| Blue Dye 5(d) | Dye 5 where $R_6$ is p-sulfo and $R_7$ is H |
| Blue Dye 5(e) | Dye 5 where $R_6$ is p-sulfo and $R_7$ is o-OCH$_3$ |
| Blue Dye 5(f) | Dye 5 where $R_6$ is m-sulfo and $R_7$ is p-Cl |
| Blue-green Dye 6(a) | Dye 6 where $R_8$ and $R_9$ are $CH_3$, $SO_3M$ is ortho and X is H |
| Green Dye 6(b) | Dye 6 where $R_8$ and $R_9$ are $CH_3$, $SO_3M$ is ortho and X is OH. |

EXAMPLE 1 a. Using Kusters equipment as described in the Textile Chemist and Colorist, January 14, 1970, pages 23-29, a 7-inch wide length of T-847 (deep-dyeing) nylon carpeting tufted onto a jute backing was run through a wet-out bath at 60°-80°C. containing 1.5 grams per liter of an organic alcohol extended with ethylene oxide and 0.6 gram per liter of a sulfated polyglycol ether. Pickup was about 80 percent. The carpeting was then continuously treated with an aqueous dye bath composition at 27°C. containing

| | |
|---|---|
| Yellow Dye 1(c) | 1 g./l. |
| Red Dye 4(a) | 1 g./l. |
| Blue Dye 5(a) | 1 g./l. |
| an organic alcohol extended with ethylene oxide | 0.25 g./l. |
| a sulfated polyglycol ether | 1.25 g./l. |
| a purified natural gum thickener | 2 g./l. |
| acetic acid | 3 g./l. |
| monosodium phosphate | to adjust the pH to 5. |

Pickup was about 400 percent. The carpeting was then run through a steamer at 100°C., the dwell time being 8 minutes. Finally, the carpeting was rinsed thoroughly and dried. A uniform deep brown shade was produced; the tufts displayed no tippiness.

b. The procedure described in (a) was repeated on 7-inch wide, jute-backed, tufted carpeting consisting of bands, each two tufts wide, of T-847 (deep-dyeing), T-846 (medium-dyeing), T-845 (light-dyeing) and T-844 (acid-modified) nylon, the pattern being repeated along the length of the carpet. The bands of deep-dyeing nylon were dyed a deep brown shade; the medium-dyeing nylon bands were much lighter in shade but on-tone vs. The deep-dyeing nylon; the light-dyeing nylon bands were dyed a very light brown shade; the acid-modified nylon bands were completely reserved.

EXAMPLE 2

The procedures of Examples 1(a) and 1(b) were repeated except that the following dye mixture was used in the dye bath;

| Yellow Dye 1(c) | 4.5 g./l. |
| Red Dye 4(b) | 1 g./l. |
| Blue Dye 5(a) | 3 g./l. |

A deep green shade was produced on the deep-dyeing nylon. No tippiness or unlevelness was apparent. A medium, on-tone shade was produced on the medium-dyeing nylon and a very light green shade, on the light-dyeing nylon. The acid-modified nylon was completely reserved.

EXAMPLE 3

The procedures of Examples 1(a) and 1(b) were repeated using the following dye mixture:

| Orange Dye 2 | 0.7 g./l. |
| Red Dye 4(a) | 1.5 g./l. |
| Blue Dye 5(a) | 1 g./l. |

A deep brown shade, much redder than that obtained in Example 1, was produced on the deep-dyeing nylon. No tippiness was observed and the levelness of shade was excellent. As with the previous examples, the shade variations on the medium- and light-dyeing nylons and reserve of the acid-modified nylon were excellent.

EXAMPLES 4-21

In these examples pieces of polypropylene-backed nylon carpeting were pot dyed with various dye combinations. The carpeting was 4 inches wide and consisted of three bands, one each of deep-dyeing, light-dyeing and acid-modified nylon. Each band was ten tufts long. 1,000 Parts of an aqueous bath were prepared so as to contain:

| an organic alcohol extended with ethylene oxide | 8 g./l. |
| a sulfated polyglycol ether | 4 g./l. |
| citric acid | 80 g./l. |
| sodium hydroxide | to adjust the pH to 5-5.5. |

25 Parts of the carpeting described above were dipped into the bath at room temperature and removed. A mixture of acid dyes was then added to the bath which was subsequently heated to the boil. The carpeting was reintroduced into the bath for 5 minutes, removed and rinsed with water. The pH of the bath was then dropped to 3 and an undyed sample of deep-dyeing nylon carpeting was added to the boiling bath and left until the dye remaining in the bath was completely exhausted onto the nylon. The degree of levelness and reserve obtained on the banded nylon carpeting by the above procedure was found to correlate very closely with the results obtained by a continuous dyeing procedure.

All the dye combinations described in the following table exhausted well and produced deep nontippy shades on the deep-dyeing nylon band and light to very light shades on the light-dyeing nylon band. The acid-modified nylon was unstained. Levelness of shade on the deep-dyeing nylon band was rated by the following scale:

5 little or no unlevelness
4 slight unlevelness
3 noticeable unlevelness
2 considerable unlevelness
1 much unlevelness

| Example Number | Dyes (% on Weight of Fiber) | Shade | Levelness on Deep-Dyeing Nylon Band |
|---|---|---|---|
| 4 | Blue Dye 5(b) (0.15%) Red Dye 4(a) (0.075%) | Violet | 4 |
| 5 | Blue Dye 5(e) (0.15%) Red Dye 4(a) (0.075%) | Violet | 5 |
| 6 | Blue Dye 5(a) (0.2%) Yellow Dye 1(b) (0.2%) | Green | 5 |
| 7 | Blue Dye 5(a) (0.2%) Yellow Dye 1(a) (0.23%) | Green | 4 |
| 8 | Blue Dye 5(d) (0.17%) Yellow Dye 1(b) (0.2%) | Green | 5 |
| 9 | Blue Dye 5(d) (0.17%) Yellow Dye 1(a) (0.23%) | Green | 5 |
| 10 | Blue Dye 5(e) (0.17%) Yellow Dye 1(b) (0.2%) | Green | 5 |
| 11 | Blue Dye 5(e) (0.17%) Yellow Dye 1(a) (0.23%) | Green | 4 |
| 12 | Blue Dye 5(f) (0.2%) Yellow Dye 1(b) (0.20%) | Green | 5 |
| 13 | Blue Dye 5(f) (0.2%) Yellow Dye 1(a) (0.23%) | Green | 5 |
| 14 | Blue Dye 5(c) (0.2%) Red Dye 4(a) (0.2%) Yellow Dye 1(c) (0.2%) | Brown | 5 |
| 15 | Blue-green Dye 6(a) (0.07%) Red Dye 4(a) (0.12%) Yellow Dye 1(c) (0.1%) | Brown | 5 |
| 16 | Green Dye 6(b) (0.04%) Red Dye 4(a) (0.15%) Yellow Dye 1(c) (0.05%) | Brown | 5 |
| 17 | Orange Dye 3(b) (0.05%) Red Dye 4(a) (0.1%) Blue Dye 5(a) (0.1%) | Brown | 5 |
| 18 | Orange Dye 3(b) (0.05%) Red Dye 4(b) (0.1%) Blue Dye 5(a) (0.1%) | Brown | 5 |
| 19 | Orange Dye 3(a) (0.05%) Red Dye 4(a) (0.15%) Blue Dye 5(a) (0.1%) | Brown | 5 |
| 20 | Orange Dye 3(c) (0.07%) | Brown | 5 |

| Example Number | Dyes (% on Weight of Fiber) | Shade | -continued Levelness on Deep-Dyeing Nylon Band |
|---|---|---|---|
| 21 | Red Dye 4(a) (0.15%) Blue Dye 5(a) (0.1%) Orange Dye 3(d) (0.22%) Red Dye 4(a) (0.15%) Blue Dye 5(a) (0.1%) | Brown | 5 |

EXAMPLE 22

25 Parts of the carpeting described in Example 4 were heated (beck dyeing) at 99°C. for 1 hour in 1,000 parts of an aqueous bath containing:

| | |
|---|---|
| Yellow Dye 1(c) | 0.04 part |
| Red Dye 4(a) | 0.03 part |
| Blue Dye 5(a) | 0.04 part |
| ethylenediaminetetraacetic acid, sodium salt | 2.5 parts |
| citric acid | 4 parts |
| sodium hydroxide | to adjust the pH to 5.8. |

The deep-dyeing nylon was dyed a deep, uniform, nontippy brown shade. The light-dyeing nylon was almost completely reserved. The acid-modified nylon was unstained. When the above procedure was repeated at pH 6.5, the light-dyeing nylon was practically unstained.

EXAMPLE 23 a. A sample of jute-backed nylon shag styling yarn carpeting containing deep-dyeing, light-dyeing and acid-modified nylon strands was run through a wet-out bath at 27°C. containing 1.5 grams per liter of an organic alcohol extended with ethylene oxide and 0.2 gram per liter of ethylenediaminetetraacetic acid, sodium salt. The carpeting was then treated with an aqueous dye bath at 27°C. containing:

| | |
|---|---|
| Yellow Dye 1(c) | 0.6 g./l. |
| Red Dye 4(a) | 0.14 g./l. |
| Blue Dye 5(a) | 0.3 g./l. |
| an organic alcohol extended with ethylene oxide | 0.05 g./l. |
| a sulfated polyglycol ether | 0.1 g./l. |
| a purified natural gum thickener | 2.5 g./l. |
| monosodium phosphate | to adjust the pH to 6. |

The carpeting was then steamed for 8 minutes at 100°C. and rinsed thoroughly with water. The strands of deep-dyeing nylon were uniformly dyed a deep green shade. The light-dyeing nylon was dyed a very light green shade. The acid-modified nylon was unstained.

b. Similar results were obtained when Red Dye 4(a) was replaced with the yellower shade Red Dye 4(b) in the procedure described in (a).

The embodiments of the invention in which an exclusive property or privilege is claimed are defined as follows:

1. Styling yarn containing deep-dyed nylon fiber which has been dyed from an aqueous dye bath having a pH of 4–7 and which contains dyes selected from 2–3 of the following groups, wherein M in each group is a cation selected from H, Li, Na, K, $NH_4$, di(hydroxy-$C_{2-3}$alkyl)-ammonium and tri(hydroxy-$C_{2-3}$alkyl)ammonium:

1. Yellow dye of the structure

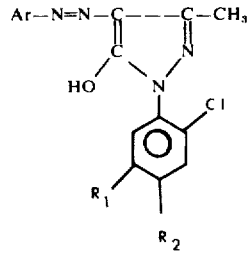

wherein
a. Ar is

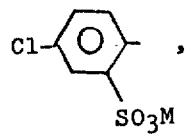

$R_1$ is Cl and $R_2$ is $SO_3M$,
b. Ar is

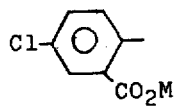

$R_1$ is Cl and $R_2$ is $SO_3M$, or
c. Ar is

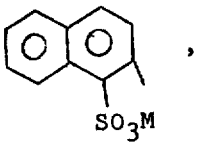

$R_1$ is $SO_3M$ and $R_2$ is H;

2. Orange dye of the structure

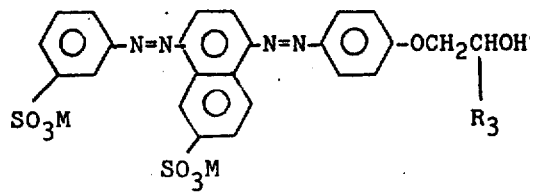

wherein $R_3$ is H, $CH_3$ or $C_2H_5$;

3. Orange dye of the structure

13
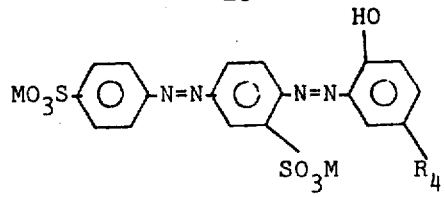
wherein $R_4$ is $C_{1-8}$ alkyl
4. Red dye of the structure
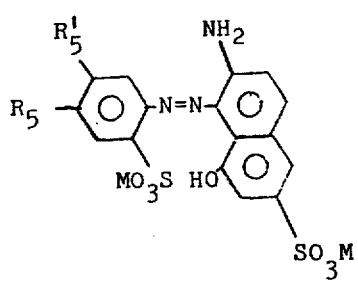
wherein one of $R_5$ and $R'_5$ is H and the other is $C_6H_5CONH$;
5. Blue dye of the structure
14
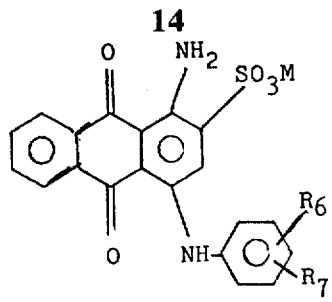
wherein $R_6$ is $SO_3M$ and $R_7$ is H, $CH_3$, $OCH_3$ or Cl, or $R_6$ is p-$NHCOCO_2H$ and $R_7$ is H; and
6. Blue-green to green dye of the structure
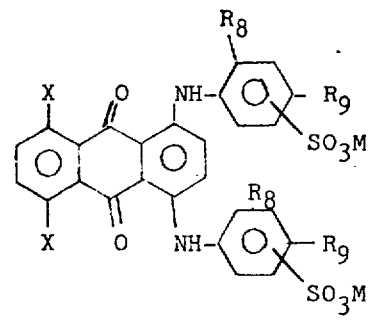
wherein X is H or OH, $R_8$ is H and $R_9$ is $C_2H_5$, $C_3H_7$, $OCH_3$ or $OC_2H_5$, or $R_8$ is $CH_3$ and $R_9$ is $CH_3$ or $OCH_3$.
* * * * *